(12) United States Patent
Umehara et al.

(10) Patent No.: US 11,593,420 B2
(45) Date of Patent: Feb. 28, 2023

(54) SIMILARITY CALCULATION APPARATUS, RECORDING MEDIUM, AND SIMILARITY CALCULATION METHOD

(71) Applicant: SCREEN HOLDINGS CO., LTD., Kyoto (JP)

(72) Inventors: Koki Umehara, Kyoto (JP); Kiyotaka Kasubuchi, Kyoto (JP); Kiyotaka Miyai, Kyoto (JP); Akiko Yoshida, Kyoto (JP); Kazuhiro Kitamura, Kyoto (JP); Manri Terada, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 5 days.

(21) Appl. No.: 17/166,666

(22) Filed: Feb. 3, 2021

(65) Prior Publication Data
US 2021/0271700 A1    Sep. 2, 2021

(30) Foreign Application Priority Data
Feb. 28, 2020 (JP) .............................. JP2020-033191

(51) Int. Cl.
*G06F 16/30* (2019.01)
*G06F 16/36* (2019.01)
*G06F 16/35* (2019.01)

(52) U.S. Cl.
CPC ............ *G06F 16/374* (2019.01); *G06F 16/35* (2019.01)

(58) Field of Classification Search
CPC ...... G06F 16/35; G06F 16/374; G06F 40/247; G06F 40/30
See application file for complete search history.

(56) References Cited

U.S. PATENT DOCUMENTS

| | | | |
|---|---|---|---|
| 2005/0065947 A1* | 3/2005 | He | G06F 40/247 |
| 2006/0069677 A1* | 3/2006 | Tanigawa | G06F 40/247 |
| 2007/0078849 A1* | 4/2007 | Slothouber | G06F 16/9535 |
| | | | 707/999.005 |
| 2013/0006975 A1* | 1/2013 | Li | G06F 40/247 |
| | | | 707/723 |
| 2013/0086058 A1* | 4/2013 | Lupu | G06F 16/00 |
| | | | 707/E17.06 |
| 2018/0089300 A1* | 3/2018 | Ahuja | G06F 16/215 |
| 2020/0285808 A1* | 9/2020 | Yoshida | G06F 40/242 |

FOREIGN PATENT DOCUMENTS

JP    2016-224482 A    12/2016

* cited by examiner

*Primary Examiner* — Mahesh H Dwivedi
(74) *Attorney, Agent, or Firm* — McDermott Will & Emery LLP (57) ABSTRACT

A similarity calculation apparatus according to the present invention includes: a name acquisition unit configured to acquire a first group name to which each word belonging to a first synonym group belongs and a second group name to which each word belonging to a second synonym group belongs; a name set generation unit configured to generate a first group name set and a second group name set; and a similarity calculation unit configured to calculate similarity between the first group name set and the second group name set. Therefore, even when a plurality of synonym groups are created, terms can be effectively unified.

1 Claim, 4 Drawing Sheets

| WORD | SYNONYM GROUP NAME | WORDS BELONGING TO SYNONYM GROUP |
|---|---|---|
| design | design.n.01 | design, designing |
| design | purpose.n.01 | purpose, intent, intention, aim, design |
| paper | composition.n.08 | composition, paper, report, theme |
| paper | newspaper.n.01 | newspaper, paper |

SIMILARITY CALCULATION APPARATUS, RECORDING MEDIUM, AND SIMILARITY CALCULATION METHOD

BACKGROUND OF THE INVENTION

Field of the Invention

Technology disclosed in the specification of the present application relates to a similarity calculation apparatus, a similarity calculation program, and a similarity calculation method.

Description of the Background Art

For example, in order to absorb inconsistent use of words in a document, a technology of creating a synonym group including a plurality of synonyms has hitherto been used (see, for example, Japanese Patent Application Laid-Open No. 2016-224482). However, when the synonym group is created by using the technology described in Japanese Patent Application Laid-Open No. 2016-224482 or the like, a plurality of synonym groups similar to each other may be created. In that case, the presence of such a plurality of available synonym groups makes it difficult to unify terms. At the same time, the operation of manually organizing those synonym groups requires a significant period of time.

SUMMARY OF THE INVENTION

The present invention is intended for a similarity calculation apparatus, a recording medium, and a similarity calculation method.

One aspect of the present invention is a similarity calculation apparatus that calculates similarity between a plurality of synonym groups. Each of the plurality of synonym groups includes a plurality of words being synonyms of each other. The similarity calculation apparatus includes: a name acquisition unit configured to acquire at least one first group name and at least one second group name, the at least one first group name being a name of one of the plurality of synonym groups to which each of the plurality of words belonging to a first synonym group of the plurality of synonym groups belongs, the at least one second group name being a name of one of the plurality of synonym groups to which each of the plurality of words belonging to a second synonym group of the plurality of synonym groups belongs; a name set generation unit configured to generate a first group name set including an element of the at least one first group name and a second group name set including an element of the at least one second group name; and a similarity calculation unit configured to calculate similarity between the first group name set and the second group name set.

Even when a plurality of synonym groups are created, terms can be effectively unified by calculating similarity between the group name sets corresponding to the synonym groups.

One aspect of the present invention is a recording medium storing a similarity calculation program. The similarity calculation program is configured to calculate similarity between a plurality of synonym groups. Each of the plurality of synonym groups includes a plurality of words being synonyms of each other. When being installed and executed by a computer, the similarity calculation program is configured to implement: causing the computer to acquire at least one first group name and at least one second group name, the at least one first group name being a name of one of the plurality of synonym groups to which each of the plurality of words belonging to a first synonym group of the plurality of synonym groups belongs, the at least one second group name being a name of one of the plurality of synonym groups to which each of the plurality of words belonging to a second synonym group of the plurality of synonym groups belongs; causing the computer to generate a first group name set including an element of the at least one first group name and a second group name set including an element of the at least one second group name; and causing the computer to calculate similarity between the first group name set and the second group name set.

Even when a plurality of synonym groups are created, terms can be effectively unified by calculating similarity between the group name sets corresponding to the synonym groups.

One aspect of the present invention is a similarity calculation method. Each of a plurality of synonym groups includes a plurality of words being synonyms of each other. The similarity calculation method includes: acquiring at least one first group name and at least one second group name, the at least one first group name being a name of one of the plurality of synonym groups to which each of the plurality of words belonging to a first synonym group of the plurality of synonym groups belongs, the at least one second group name being a name of one of the plurality of synonym groups to which each of the plurality of words belonging to a second synonym group of the plurality of synonym groups belongs; generating a first group name set including an element of the at least one first group name and a second group name set including an element of the at least one second group name; and calculating similarity between the first group name set and the second group name set.

Even when a plurality of synonym groups are created, terms can be effectively unified by calculating similarity between the group name sets corresponding to the synonym groups.

Therefore, the object of the present invention is to effectively unify terms even when a plurality of synonym groups are created.

These and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment will be described below with reference to the attached drawings. The following embodiment will also describe detailed features and the like for the sake of description of technology, but those are merely an example, and all of those are not necessarily essential features to carry out the embodiment.

Note that the drawings are schematically illustrated, and for the sake of convenience of description, the configurations are omitted or the configurations are simplified in the drawings as appropriate. Further, the interrelationship of the size and the position between the configurations and the like illustrated in each of different drawings is not necessarily illustrated accurately, and may be changed as appropriate. Further, in the drawings such as plan views as well as cross-sectional views, hatching may be provided for the sake of easy understanding of the details of the embodiment.

Further, in the description illustrated below, similar components are denoted by the same reference signs in illustration, and are also given similar terms and functions. Thus, detailed description thereof may be omitted in order to avoid redundancy.

Further, in the following description, when the expressions such as "provide", "include", and "have" are used to describe a certain component, unless otherwise specifically noted, the expressions are not construed as exclusive expression that may exclude the presence of other components.

Further, in the following description, also when the ordinal numbers such as "first" and "second" are used as well, these terms are used for the sake of convenience of easy understanding of the details of the embodiment, and the order and the like that may be defined by these ordinal numbers are not restrictive.

Embodiment

A similarity calculation apparatus, a similarity calculation program, and a similarity calculation method according to the present embodiment will be described below.

<Configuration of Similarity Calculation Apparatus>

Figure 1:
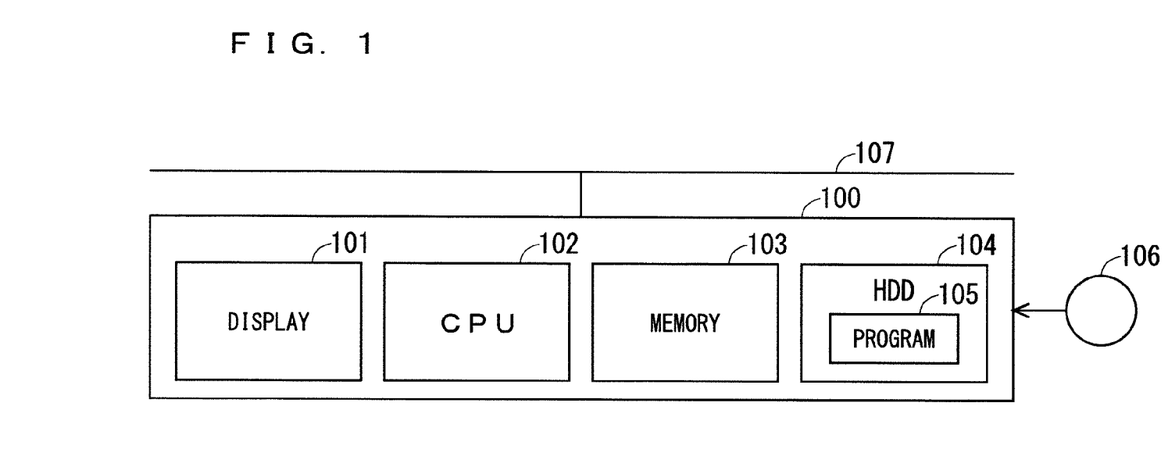
FIG. 1 is a diagram illustrating an example of a hardware configuration of a similarity calculation apparatus according to an embodiment.

FIG. 1 is a diagram illustrating an example of a hardware configuration of a similarity calculation apparatus 100 according to the present embodiment.

As illustrated in FIG. 1, the similarity calculation apparatus 100 is at least a computer in which a program 105 that is used for calculation operation of similarity between synonym groups is installed, and includes a central processing unit (specifically, CPU) 102, a memory 103, a hard disk drive (specifically, HDD) 104, and a display 101.

In the similarity calculation apparatus 100, a corresponding program 105 is installed in the HDD 104. The installation of the program 105 may be performed by writing into the HDD 104 data that is read from an external storage medium 106 such as a compact disc (specifically, CD), a digital versatile disc (specifically, DVD), and a universal serial bus (specifically, USB) memory, or may be performed by writing into the HDD 104 data that is received via a network 107.

Further, the HDD 104 may be replaced with an auxiliary storage apparatus of another type. For example, the HDD 104 may be replaced with a solid state drive (specifically, SSD), a random access memory (specifically, RAM) disk, or the like.

In the similarity calculation apparatus 100, the program 105 installed in the HDD 104 is loaded into the memory 103, and the loaded program 105 is executed by the CPU 102. In this manner, the computer executes the program 105 and thereby functions as the similarity calculation apparatus 100.

Note that at least a part of the processing performed by the CPU 102 may be performed by a processor other than the CPU 102. For example, at least a part of the processing performed by the CPU 102 may be performed by a graphics processing unit (GPU) or the like. Further, at least a part of the processing performed by the CPU 102 may be performed by hardware that does not execute the program.

Figure 2:
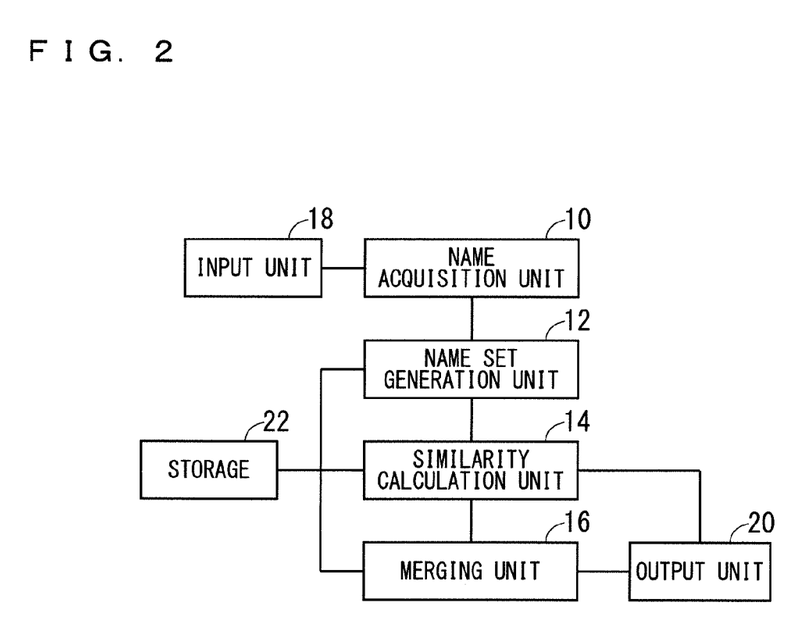
FIG. 2 is a diagram illustrating an example of a functional configuration of the similarity calculation apparatus according to the embodiment.

FIG. 2 is a diagram illustrating an example of a functional configuration of the similarity calculation apparatus 100 according to the present embodiment.

As illustrated in FIG. 2, the similarity calculation apparatus 100 at least includes a name acquisition unit 10, a name set generation unit 12, and a similarity calculation unit 14. Further, the similarity calculation apparatus 100 may include a merging unit 16, an input unit 18, an output unit 20, and a storage 22. The input unit 18 and the output unit 20 are implemented by the display 101 of FIG. 1 or the like. Further, the storage 22 is, for example, implemented by at least one of the memory 103 and the HDD 104 of FIG. 1. Further, the name acquisition unit 10, the name set generation unit 12, the similarity calculation unit 14, and the merging unit 16 are, for example, implemented by causing the CPU 102 of FIG. 1 to execute the program 105.

The name acquisition unit 10 acquires a name of a synonym group (hereinafter a synonym group name) to which each word belonging to a synonym group belongs.

Here, the synonym group is a set including a plurality of words being synonyms of each other. Further, a synonym is a word that has a similar meaning despite a different word form, pronunciation, spell, or the like.

Further, except for technical terms to be described later, each word in the present embodiment belongs to at least two synonym groups, and each technical term to be described later belongs to only one synonym group.

The name set generation unit 12 generates a group name set including an element of a synonym group name. The generated group name set is stored in the storage 22.

The similarity calculation unit 14 calculates similarity between a plurality of group name sets. Further, the similarity calculation unit 14 judges similarity between corresponding synonym groups, based on the calculated similarity between the group name sets. The calculated similarity between the group name sets and the similarity between the corresponding synonym groups are stored in the storage 22.

When the similarity between a plurality of group name sets (or the similarity between the synonym groups) is equal to or more than a threshold, the merging unit 16 merges synonym groups corresponding to these group name sets. The synonym group generated through the merge is stored in the storage 22.

The input unit 18 receives input of data related to the synonym groups. Further, the output unit 20 outputs data related to the calculated similarity between the group name sets (or the similarity between the synonym groups) or the synonym group generated through the merge.

<Operation of Similarity Calculation Apparatus>

Next, operation of the similarity calculation apparatus 100, specifically, operation of calculating similarity between a plurality of synonym groups, will be described with reference to FIG. 3 and FIG. 4. Note that FIG. 3 is a flowchart illustrating an example of similarity calculation operation.

Here, the plurality of synonym groups mentioned in the following description may be such synonym groups that all of the synonym groups are created with common criteria, or may be such synonym groups that some of the synonym groups are created with criteria different from others. Specifically, a synonym group originally created by a user and a synonym group created with criteria adopted by an external dictionary (for example, WordNet) or the like may be present in a mixed manner.

Figure 3:
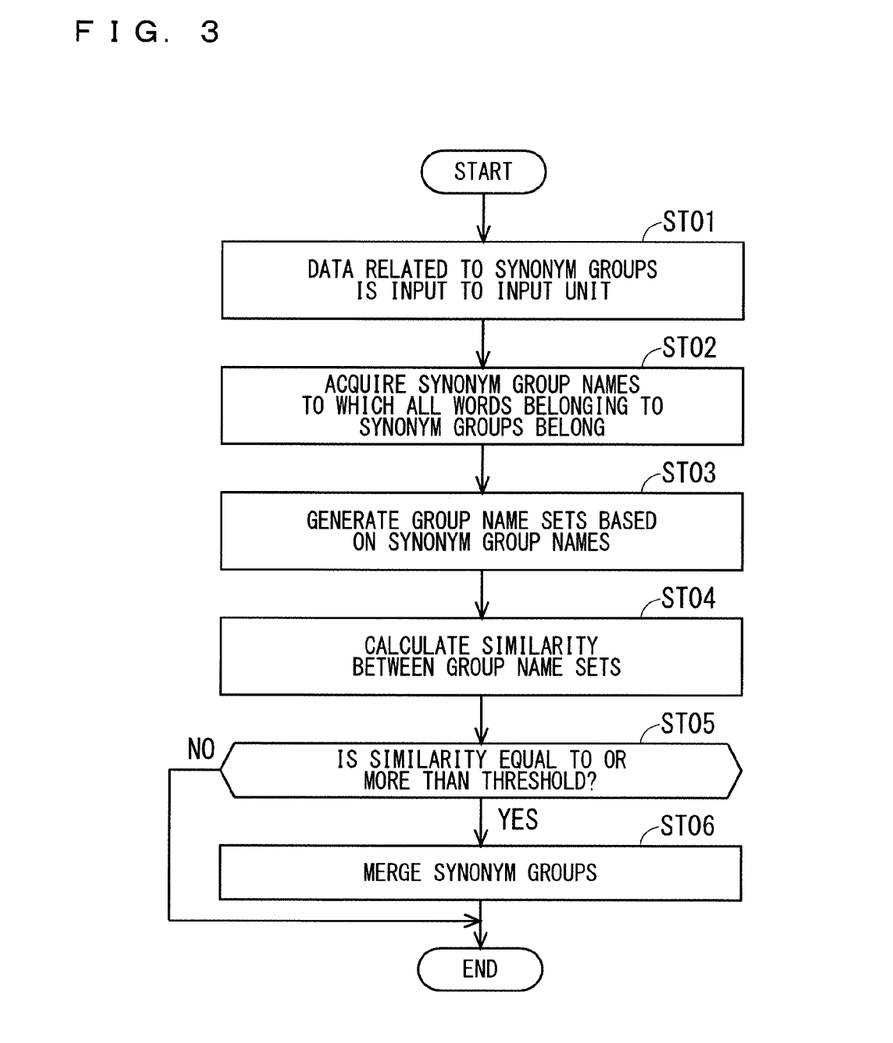
FIG. 3 is a flowchart illustrating an example of similarity calculation operation.

First, data related to two synonym groups (synonym group G1 and synonym group G2) is input to the input unit 18 (Step ST01 of FIG. 3). Here, the synonym group G1 is a synonym group including (end, finish, stop), and the synonym group G2 is a synonym group including (cease, terminate, finish).

Further, the data related to the synonym groups at least includes data of each word included in the synonym groups and data of the synonym group name to which those words belong. The synonym group name is associated with corresponding words.

Figure 4:
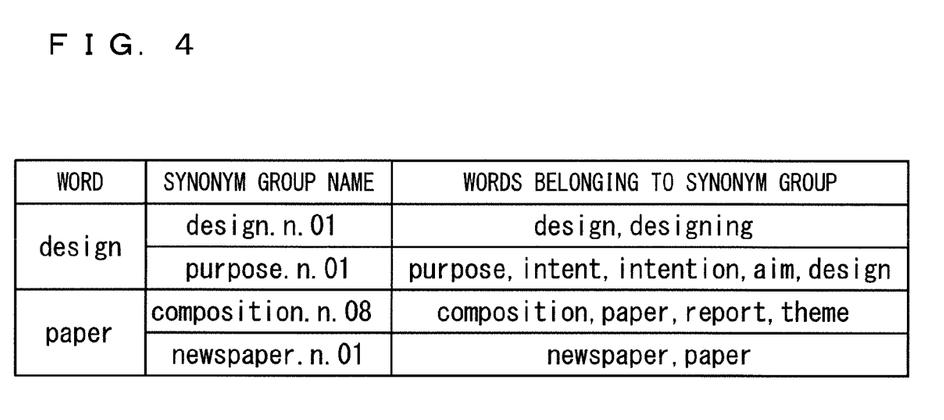
FIG. 4 is a diagram illustrating an example of synonym groups to each of which a certain word belongs, and words that belong to each of the synonym groups.

FIG. 4 is a diagram illustrating an example of synonym groups to each of which a certain word belongs, and words that belong to each of the synonym groups. Note that the synonym groups illustrated in FIG. 4 illustrate some of the corresponding words.

As illustrated in FIG. 4, the word "design" belongs to a synonym group design.n.01 and a synonym group purpose.n.01. Here, "design" and "designing" belong to the synonym group design.n.01, and "purpose", "intent", "intention", "aim", and "design" belong to the synonym group purpose.n.01.

In a similar manner, the word "paper" belongs to a synonym group composition.n.08 and a synonym group newspaper.n.01. Here, "composition", "paper", "report", and "theme" belong to the synonym group composition.n.08, and "newspaper" and "paper" belong to the synonym group newspaper.n.01.

Next, regarding the data of each of the synonym groups input to the input unit 18, the name acquisition unit 10 acquires the synonym group names to which all of the words belonging to respective synonym groups belong (Step ST02 of FIG. 3).

Next, the name set generation unit 12 generates group name sets, based on the synonym group names acquired in the name acquisition unit 10 (Step ST03 of FIG. 3).

The generated group name sets are stored in the storage 22.

In the example of the present embodiment, as a set of the synonym group names to which each of the words "end", "finish", and "stop" in the synonym group G1 belongs, 53 synonym group names, such as end.n.01, end.v.04, finish.n.08, stop.v.01, and period.n.07, are obtained. A set of these is referred to as a group name set G11. Note that, in the following, in a similar manner, the same synonym group names are not included in a set of the synonym group names (specifically, overlap of the same synonym group names is not permitted). Further, the group name set G11 may include a name of the synonym group G1 itself.

In a similar manner, as a set of the synonym group names to which each of the words "cease", "terminate" and "finish" in the synonym group G2 belongs, 20 synonym group names, such as cease.n.01, complete.v.01, and finish.n.08, are obtained. A set of these is referred to as a group name set G12. Note that the group name set G12 may include a name of the synonym group G2 itself.

Of the above, there are 18 synonym group names that belong to both of the group name set G11 and the group name set G12 in common.

Next, the similarity calculation unit 14 calculates similarity between the group name sets (Step ST04 of FIG. 3). In the example of the present embodiment, the similarity calculation unit 14 calculates similarity between the group name sets by using the Dice coefficient. The calculated similarity between the group name sets is stored in the storage 22.

Specifically, by using the following expression (1), similarity between the group name set G11 and the group name set G12 is calculated.

$$\text{Dice}(G11,G12)=2(G11\cap G12)/|G11|+|G12| \quad (1)$$

Here, |G11| represents the number of elements of the group name set G11, |G12| represents the number of elements of the group name set G12, and G11∩G12 represents the number of elements that are common to both of the group name set G11 and the group name set G12. As described above, the group name set G11 is a set including 53 elements, and the group name set G12 is a set including 20 elements. Further, the number of elements that are common to both of the group name set G11 and the group name set G12 is 18.

Thus, the similarity between the group name set G11 and the group name set G12 can be expressed as approximately 0.493. Based on the calculated similarity between the group name sets, similarity between the corresponding synonym group G1 and synonym group G2 can be expressed in a similar numerical value, for example.

Here, another synonym group G3 is assumed. The synonym group G3 is a synonym group including (complete, accomplish, finish).

The synonym group G3 is also input to the input unit 18 in a manner similar to the synonym group G1 and the synonym group G2 (Step ST01 of FIG. 3), and the name acquisition unit 10 acquires the synonym group names to which all of the words belonging to the synonym group G3 belong (Step ST02 of FIG. 3). Then, the name set generation unit 12 generates a group name set, based on the acquired synonym group names (Step ST03 of FIG. 3).

In the example of the present embodiment, as a set of the synonym group names to which each of the words "complete", "accomplish", and "finish" in the synonym group G3 belongs, 26 synonym group names, such as achieve.v.01, complete.v.01, and finish.n.08, are obtained. This is referred to as a group name set G13. Note that the group name set G13 may include a name of the synonym group G3 itself.

Of the above, there are 15 synonym group names that are common to both of the group name set G11 and the group name set G13.

Next, in a manner similar to the case of the group name set G11 and the group name set G12, the similarity calculation unit 14 calculates similarity between the group name set G11 and the group name set G13 (Step ST04 of FIG. 3). The calculated similarity between the group name sets is stored in the storage 22.

As described above, the group name set G11 is a set including 53 elements, and the group name set G13 is a set including 26 elements. Further, the number of elements that are common to both of the group name set G11 and the group name set G13 is 15.

Thus, when calculation is performed with |G12| of the above expression (1) being replaced by |G13| (the number of elements of the group name set G13) and G11∩G12 being replaced by G11 ∩G13 (the number of elements common to both of the group name set G11 and the group name set G13), the similarity between the group name set G11 and the group name set G13 can be expressed as approximately 0.379. Based on the calculated similarity between the group name sets, similarity between the corresponding synonym group G1 and synonym group G3 can be expressed in a similar numerical value, for example.

As described above, when similarity between the group name sets is calculated, terms can be effectively unified by performing, for example, merging to be described later between synonym groups whose similarity between group name sets is high, even if a plurality of synonym groups are created for one word.

In the example of the present embodiment, the synonym group G1, the synonym group G2, and the synonym group G3 include "finish" in common. The reference to the synonym group names to which the words belonging to each of the synonym groups belong leads to the following result: between the synonym group G1 and the synonym group G2 having a similar tendency of meanings of the words constituting the synonym groups, relatively high similarity is calculated between the group name sets, whereas between the synonym group G1 and the synonym group G3 having a different tendency of meanings of the words constituting the synonym groups, relatively low similarity is calculated between the group name sets.

Thus, according to the present embodiment, by calculating similarity between the group name sets corresponding to the synonym groups in consideration of a tendency of meanings of the words constituting the synonym groups, similarity between corresponding synonym groups can be judged with high accuracy. Further, for example, terms can be effectively unified by using only the synonym groups having high similarity.

Further, even when the synonym group includes a polysemous word, the synonym group name that reflects a plurality of meanings of the polysemous word is included in the group name set. Therefore, similarity between the group name sets can be calculated in consideration of the extent of the meanings of the polysemous word.

Next, the merging unit 16 judges whether or not the similarity between the group name sets calculated in the similarity calculation unit 14 (or the similarity between the synonym groups) is equal to or more than a predetermined threshold (Step ST05 of FIG. 3). Then, if the similarity between the group name sets (or the similarity between the synonym groups) is equal to or more than the predetermined threshold, specifically, if the result corresponds to "YES" branching from Step ST05 illustrated in FIG. 3, the processing proceeds to Step ST06 illustrated in FIG. 3. In contrast, if the similarity between the group name sets (or the similarity between the synonym groups) is not equal to or more than the predetermined threshold, specifically, if the result corresponds to "NO" branching from Step ST05 illustrated in FIG. 3, the operation ends.

In Step ST06 of FIG. 3, the merging unit 16 merges the synonym groups corresponding to the group name sets whose similarity between the group name sets is calculated. In the present embodiment, for example, the threshold is set to 0.4, the corresponding synonym group G1 and synonym group G2 are merged, and all of the words included in the synonym group G1 and all of the words included in the synonym group G2 are included in one synonym group. In this case, the synonym groups are merged so that the words do not overlap. In contrast, similarity between the group name sets corresponding to the group name set G11 and the group name set G13 is less than the threshold, and thus these synonym groups are not merged. Note that the threshold can be freely set by a user.

<Case of Belonging to Only One Synonym Group>

The following will describe operation of a case in which at least one of the plurality of synonym groups in which similarity of corresponding group name sets is calculated includes a word that only belongs to one synonym group.

Note that a word that only belongs to one synonym group, specifically, a word that does not belong to any of the synonym groups other than the synonym group that the word itself belongs, is hereinafter referred to as a technical term.

When any of the synonym groups includes the technical term, the number of elements of the group name set is adjusted by using the following expression (2).

NUMBER OF ELEMENTS OF GROUP NAME SET=$G_{ns}$+$G_{ns}$×=NUMBER OF TECHNICAL TERMS/NUMBER OF ELEMENTS OTHER THAN TECHNICAL TERMS (2)

Here, $G_{ns}$ represents a set of synonym group names to which elements other than the technical term belong.

With the number of elements of the group name set being adjusted as described above, calculation of similarity between the group name sets illustrated in Step ST04 of FIG. 3 is performed. In addition, Step ST05 of FIG. 3 and merging of the synonym groups illustrated in Step ST06 are performed as necessary.

Specifically, the following will describe a case in which similarity between corresponding group name sets is calculated regarding a synonym group G4 and a synonym group G5 including a technical term.

The synonym group G4 is a synonym group including (terminate_job, terminate, finish), and the synonym group G5 is a synonym group including (complete_job, accomplish_job, finish). Here, terminate_job is a technical term.

As a set of synonym group names to which each of the words "terminate_job", "terminate", and "finish" in the synonym group G4 belongs, 18 synonym group names, such as end.v.03, complete.v.01, and finish.n.08, are obtained. A set of these is referred to as a group name set G14. Note that the group name set G14 may include a name of the synonym group G4 itself.

In a similar manner, as a set of synonym group names to which each of the words "complete_job", "accomplish_job", and "finish" in the synonym group G5 belongs, 15 synonym group names, such as end.v.01, complete.v.01, and finish.n.08, are obtained. A set of these is referred to as a group name set G15. Note that the group name set G15 may include a name of the synonym group G5 itself.

Of the above, there are 17 synonym group names that are common to both of the group name set G11 and the group name set G14. Further, there are 15 synonym group names that are common to both of the group name set G11 and the group name set G15.

In this case, the number of elements of the group name set G14 when similarity between the group name set G11 corresponding to the synonym group G1 and the group name set G14 corresponding to the synonym group G4 is calculated is adjusted and increased as follows.

NUMBER OF ELEMENTS OF GROUP NAME SET $G14$=18+18×½=27

In a similar manner, the number of elements of the group name set G15 when similarity between the group name set G11 corresponding to the synonym group G1 and the group name set G15 corresponding to the synonym group G5 is calculated is adjusted and increased as follows.

NUMBER OF ELEMENTS OF GROUP NAME SET $G15$=15+15×2/1=45

Thus, when calculation is performed with |G12| of the above expression (1) being replaced by |G14| (the number of elements of the group name set G14) and G11∩G12 being replaced by G11∩G14 (the number of elements common to both of the group name set G11 and the group name set G14), the similarity between the group name set G11 and the group name set G14 can be expressed as approximately 0.425. Based on the calculated similarity between the group name sets, similarity between the corresponding synonym group G1 and synonym group G4 can be expressed in a similar numerical value, for example.

In a similar manner, when calculation is performed with |G12| of the above expression (1) being replaced by |G15| (the number of elements of the group name set G15) and G11∩G12 being replaced by G11∩G15 (the number of elements common to both of the group name set G11 and the group name set G15), the similarity between the group name set G11 and the group name set G15 can be expressed as approximately 0.306. Based on the calculated similarity between the group name sets, similarity between the corresponding synonym group G1 and synonym group G5 can be expressed in a similar numerical value, for example.

In this manner, adjustment of the number of elements of a corresponding group name set regarding the synonym group including a technical term can prevent a case in which similarity is calculated to be excessively high due to calculation of similarity in consideration of only the elements other than the technical term. Therefore, accuracy of calculation of similarity between the group name sets can be enhanced.

<Effects Produced by Above-Described Embodiment>

Next, an example of effects produced by the above-described embodiment will be described. Note that the following will describe the effects based on a specific configuration illustrated in the above-described embodiment. Such a specific configuration, however, may be replaced with another specific configuration illustrated in the specification of the present application in so far as similar effects are produced.

According to the above-described embodiment, the similarity calculation apparatus includes a name acquisition unit 10, a name set generation unit 12, and a similarity calculation unit 14. The name acquisition unit 10 acquires at least one first group name (synonym group name) and at least one second group name (synonym group name). The at least one first group name is a name of a synonym group to which each word belonging to a first synonym group (for example, the synonym group G1) of a plurality of synonym groups belongs. The at least one second group name is a name of a synonym group to which each word belonging to a second synonym group (for example, the synonym group G2) of the plurality of synonym groups belongs. The name set generation unit 12 generates a first group name set (for example, the group name set G11) including an element of the at least one first group name (synonym group name) and a second group name set (for example, the group name set G12) including an element of the at least one second group name (synonym group name). Further, the similarity calculation unit 14 calculates similarity between the first group name set (for example, the group name set G11) and the second group name set (for example, the group name set G12).

According to the configuration as described above, even when a plurality of synonym groups are created, similarity between the synonym groups can be judged in consideration of a tendency of meanings of the words constituting the synonym groups by calculating similarity between the group name sets corresponding to the synonym groups. Therefore, for example, by merging the synonym groups having high similarity, terms can be effectively unified. Note that, when the synonym group includes a polysemous word and similarity between the synonym groups is calculated simply based on presence or absence of common words without consideration of a tendency of meanings of the words, even synonym groups having different tendencies of meanings of the words included in the synonym groups may be calculated as having high similarity. However, according to the above-described configuration, such inconvenience can be prevented.

Note that similar effects can be produced even when another configuration illustrated in the specification of the present application is added to the above-described configuration as appropriate, specifically, even when another configuration in the specification of the present application not referred to as the above-described configuration is added as appropriate.

Further, according to the above-described embodiment, the similarity calculation apparatus 100 includes a merging unit 16 that merges corresponding first synonym group and second synonym group when similarity between the group name sets is equal to or more than a threshold. According to the configuration as described above, corresponding synonym groups having high similarity between the group name sets can be merged. Thus, by merging the synonym groups having a similar tendency of meanings of the words constituting the synonym groups, terms can be effectively unified by using the merged synonym group. Further, the threshold used for judgement of the similarity between the group name sets can be adjusted, and thus strictness of merge judgement can be adjusted according to usage.

Further, according to the above-described embodiment, the similarity calculation unit 14 calculates the similarity by using the Dice coefficient. According to the configuration as described above, the similarity between corresponding synonym groups can be judged based on the similarity between the group name sets calculated by using the Dice coefficient.

Further, according to the above-described embodiment, the similarity calculation unit 14 increases the number of elements of the first group name set according to the number of words (specifically, technical terms) in which the number of first group names that can be acquired in the first group name set is only one, and increases the number of elements of the second group name set according to the number of words (specifically, technical terms) in which the number of second group names that can be acquired in the second group name set is only one. The configuration as described above can prevent a case in which similarity between the group name sets is calculated to be excessively high due to reduction of an ostensible number of elements of the group name set in consideration only of the elements other than the technical terms. Therefore, accuracy of calculation of similarity between the group name sets can be enhanced.

According to the above-described embodiment, when being installed and executed by a computer (for example, the CPU 102), the similarity calculation program causes the CPU 102 to acquire at least one first group name and at least one second group name. The at least one first group name is a name of a synonym group to which each word belonging to a first synonym group of a plurality of synonym groups belongs. The at least one second group name is a name of a synonym group to which each word belonging to a second synonym group of the plurality of synonym groups belongs. Further, the similarity calculation program causes the CPU 102 to generate a first group name set including an element of the at least one first group name and a second group name set including an element of the at least one second group name. Further, the similarity calculation program causes the CPU 102 to calculate similarity between the first group name set and the second group name set.

According to the configuration as described above, even when a plurality of synonym groups are created, similarity between the synonym groups can be judged in consideration of a tendency of meanings of the words constituting the synonym groups by calculating similarity between the group name sets corresponding to the synonym groups. Therefore, for example, terms can be effectively unified by using only the synonym groups having high similarity.

Further, the above-described program may be stored in a computer-readable portable recording medium, such as a magnetic disk, a flexible disk, an optical disc, a compact disc, a Blu-ray (registered trademark) disc, and a DVD. Further, the portable recording medium storing the program for implementing the above-described function may be commercially distributed.

According to the above-described embodiment, the similarity calculation method includes: acquiring at least one first group name and at least one second group name, the at least one first group name being a name of a synonym group to which each word belonging to a first synonym group of a plurality of synonym groups belongs, the at least one second group name being a name of a synonym group to which each word belonging to a second synonym group of the plurality of synonym groups belongs; generating a first group name set including an element of the at least one first group name and a second group name set including an element of the at least one second group name; and calculating similarity between the first group name set and the second group name set.

According to the configuration as described above, even when a plurality of synonym groups are created, similarity between the synonym groups can be judged in consideration of a tendency of meanings of the words constituting the synonym groups by calculating similarity between the group name sets corresponding to the synonym groups. Therefore, for example, terms can be effectively unified by using only the synonym groups having high similarity.

Note that, unless otherwise specifically noted, the order in which each processing is performed may be changed.

<Modifications of Above-Described Embodiment>

In the above-described embodiment, the Dice coefficient is used to calculate similarity between the synonym groups. However, the similarity calculation method is not limited to the method, and for example, the Jaccard coefficient, the Simpson coefficient, or the like may be used.

Thus, numerous unillustrated modifications and equivalents are assumable within the scope of the technology disclosed in the specification of the present application. For example, a case in which at least one component is modified, added, or omitted is included.

Further, each component described in the above-described embodiment is assumed as software or firmware, or as hardware corresponding thereto. In both of the concepts, each component is referred to as a "unit", a "processing circuit" (circuitry), or the like.

Note that, in the present invention, any component in the present embodiment can be modified or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A similarity calculation apparatus that calculates similarity between a plurality of synonym groups,
   each of the plurality of synonym groups including a plurality of words being synonyms of each other,
   the similarity calculation apparatus comprising:
      at least one processor to execute a program; and
      at least one memory to store the program, when executed by the processor, causing the processor to be configured to:
         acquire at least one first group name and at least one second group name, the at least one first group name being a name of one of the plurality of synonym groups to which each of the plurality of words belonging to a first synonym group of the plurality of synonym groups belongs, the at least one second group name being a name of one of the plurality of synonym groups to which each of the plurality of words belonging to a second synonym group of the plurality of synonym groups belongs;
         generate a first group name set including an element of the at least one first group name and a second group name set including an element of the at least one second group name; and
         calculate similarity between the first group name set and the second group name set,
   wherein the processor increases a number of the elements of the first group name set according to a number of the plurality of words in which a number of the at least one first group name that can be acquired in the first group name set is only one, and increases a number of the elements of the second group name set according to a number of the plurality of words in which a number of the at least one second group name that can be acquired in the second group name set is only one.

* * * * *